United States Patent
Deshmukh et al.

(10) Patent No.: US 12,373,418 B2
(45) Date of Patent: Jul. 29, 2025

(54) GRANULAR REPLICATION OF VOLUME SUBSETS

(71) Applicant: NetApp Inc., San Jose, CA (US)

(72) Inventors: Vijay Mohan Deshmukh, Fremont, CA (US); Atul Ramesh Pandit, San Jose, CA (US); Pawan Saxena, Pleasanton, CA (US)

(73) Assignee: NetApp, Inc., San Jose, CA (US)

( * ) Notice: Subject to any disclaimer, the term of this patent is extended or adjusted under 35 U.S.C. 154(b) by 0 days.

(21) Appl. No.: 18/502,287

(22) Filed: Nov. 6, 2023

(65) Prior Publication Data

US 2024/0193149 A1  Jun. 13, 2024

Related U.S. Application Data

(63) Continuation of application No. 17/892,179, filed on Aug. 22, 2022, now Pat. No. 11,809,402, which is a continuation of application No. 14/689,936, filed on Apr. 17, 2015, now Pat. No. 11,423,004.

(51) Int. Cl.
    *G06F 16/23* (2019.01)
    *G06F 16/245* (2019.01)
    *G06F 16/27* (2019.01)

(52) U.S. Cl.
    CPC ........ *G06F 16/2358* (2019.01); *G06F 16/245* (2019.01); *G06F 16/27* (2019.01)

(58) Field of Classification Search
    CPC ..... G06F 16/2358; G06F 16/245; G06F 16/27
    See application file for complete search history.

(56) References Cited

U.S. PATENT DOCUMENTS

| | | | |
|---|---|---|---|
| 6,038,639 A | 3/2000 | O'Brien et al. | |
| 7,308,545 B1 | 12/2007 | Kekre et al. | |
| 7,349,913 B2 | 3/2008 | Clark et al. | |
| 7,870,172 B1 | 1/2011 | Sarma | |
| 8,099,387 B2 | 1/2012 | Boyd et al. | |
| 8,335,771 B1 * | 12/2012 | Natanzon | G06F 16/2308 707/684 |
| 8,407,435 B2 * | 3/2013 | Fienblit | G06F 11/1466 711/162 |
| 8,949,614 B1 | 2/2015 | Jernigan, IV et al. | |

(Continued)

OTHER PUBLICATIONS

Notice of Allowance mailed Jun. 28, 2023 for U.S. Appl. No. 17/892,179, filed Aug. 22, 2022, 9 pages.

*Primary Examiner* — James E Richardson
(74) *Attorney, Agent, or Firm* — Cooper Legal Group, LLC

(57) ABSTRACT

Data is replicated on a backup node, where the granularity of the replication can be less than a full volume. A data consistency group comprising a subset of data for a volume is defined for a primary node. A set of differences for the data consistency group is sent to a backup node. The backup node creates change logs in response to receiving the set of differences. In response to receiving a request to access a file having data in the data consistency group, the backup node creates a clone of the file. The backup node determines whether an update to a data block of the file exists in the change logs. In response to determining that the update to the data block exists in the change logs, the backup node updates a copy of the data block for the cloned file with data in the change logs.

20 Claims, 7 Drawing Sheets

(56) References Cited

U.S. PATENT DOCUMENTS

| | | | |
|---|---|---|---|
| 9,043,567 B1* | 5/2015 | Modukuri | G06F 3/067 |
| | | | 711/162 |
| 9,063,892 B1* | 6/2015 | Taylor | G06F 11/1469 |
| 9,087,112 B1* | 7/2015 | Natanzon | G06F 16/27 |
| 9,135,120 B1* | 9/2015 | Natanzon | G06F 11/2097 |
| 9,218,252 B1* | 12/2015 | Revur | G06F 11/004 |
| 9,405,481 B1* | 8/2016 | Cohen | G06F 3/065 |
| 10,152,250 B1* | 12/2018 | Xiong | G06F 3/0619 |
| 10,185,583 B1* | 1/2019 | Natanzon | G06F 11/2097 |
| 10,621,058 B2* | 4/2020 | Patnaik | G06F 11/2094 |
| 11,423,004 B2 | 8/2022 | Deshmukh et al. | |
| 11,567,674 B2* | 1/2023 | Kaushik | G06F 11/2082 |
| 11,809,402 B2 | 11/2023 | Deshmukh et al. | |
| 2003/0195903 A1 | 10/2003 | Manley et al. | |
| 2006/0080574 A1 | 4/2006 | Saito et al. | |
| 2007/0136389 A1* | 6/2007 | Bergant | H04L 67/1095 |
| 2007/0260830 A1 | 11/2007 | Faibish et al. | |
| 2007/0276885 A1 | 11/2007 | Valiyaparambil et al. | |
| 2008/0034016 A1 | 2/2008 | Cisler et al. | |
| 2008/0172542 A1 | 7/2008 | Kaushik | |
| 2008/0294858 A1 | 11/2008 | Sakai et al. | |
| 2008/0301203 A1 | 12/2008 | Adkins et al. | |
| 2009/0300304 A1 | 12/2009 | Boyd et al. | |
| 2011/0099187 A1 | 4/2011 | Hansen | |
| 2012/0233522 A1 | 9/2012 | Barton et al. | |
| 2012/0323850 A1 | 12/2012 | Hildebrand et al. | |
| 2012/0330903 A1 | 12/2012 | Periyagaram et al. | |
| 2013/0006930 A1 | 1/2013 | Taniguchi et al. | |
| 2014/0025770 A1 | 1/2014 | Warfield et al. | |
| 2014/0149670 A1 | 5/2014 | Ezra et al. | |
| 2016/0077919 A1 | 3/2016 | Duggan et al. | |
| 2016/0085837 A1 | 3/2016 | Kotagiri et al. | |
| 2017/0249222 A1* | 8/2017 | Patnaik | G06F 3/0665 |
| 2022/0398240 A1 | 12/2022 | Deshmukh et al. | |

* cited by examiner

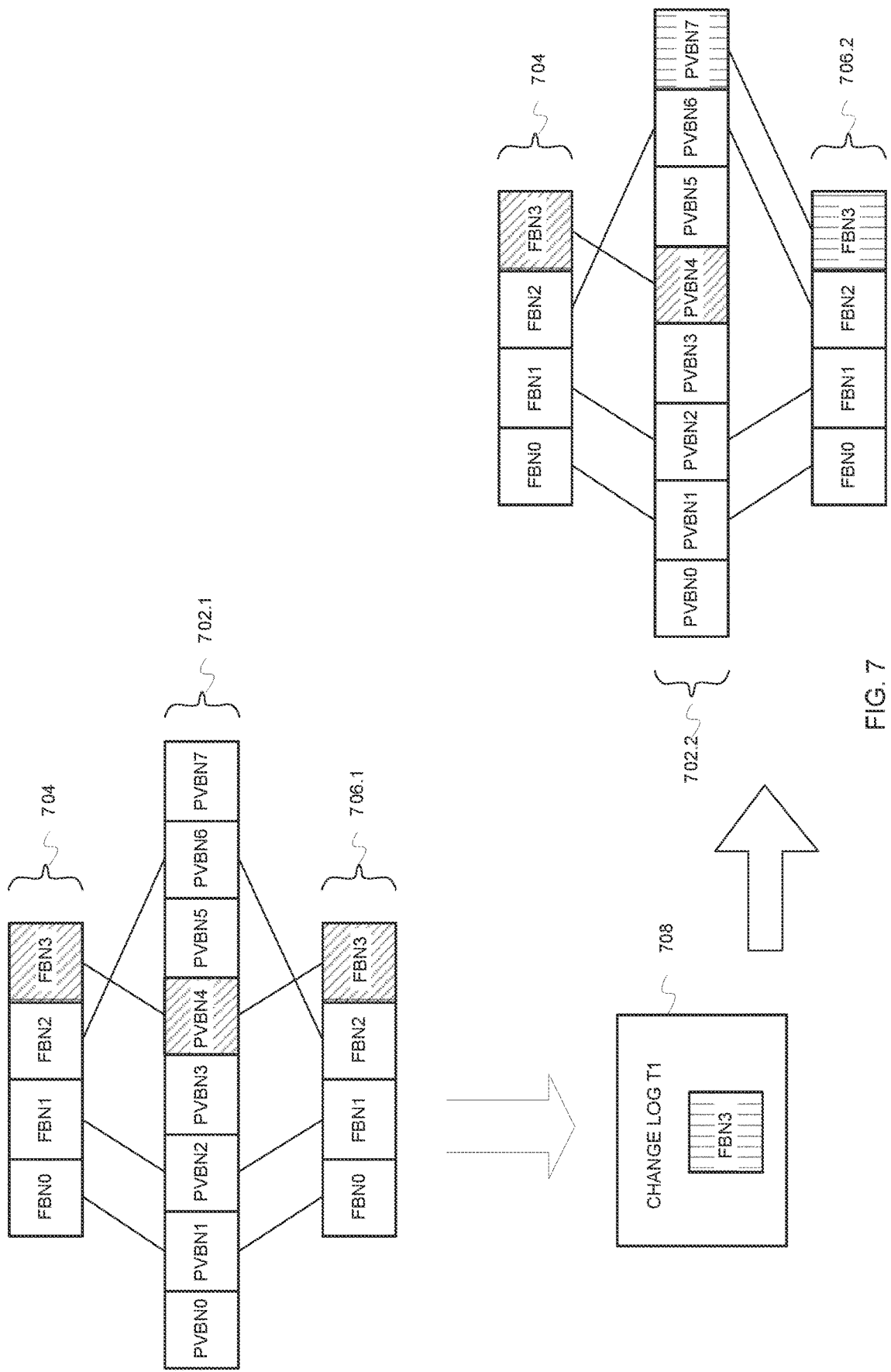

GRANULAR REPLICATION OF VOLUME SUBSETS

RELATED APPLICATION

This application claims priority to and is a continuation of U.S. Application No. 17/892,179, filed on Aug. 22, 2022, now allowed, titled "GRANULAR REPLICATION OF VOLUME SUBSETS," which claims priority to and is a continuation of U.S. Pat. No. 11,423,004, filed on Apr. 17, 2015, titled "GRANULAR REPLICATION OF VOLUME SUBSETS," which are incorporated herein by reference.

BACKGROUND

Aspects of the disclosure generally relate to the field of data storage systems, and, more particularly, to granular replication of volume subsets in data storage systems.

A networked storage system is a processing system that is used to store and retrieve data on behalf of one or more hosts on a network. One or more storage controllers in the networked storage system operate on behalf of one or more hosts to store and manage data in a set of mass storage devices, such as magnetic or optical storage-based disks or tapes. Some storage controllers are designed to service file-level requests from hosts, as is commonly the case with file servers used in network attached storage (NAS) environments. Other storage controllers are designed to service extent-level requests from hosts, as with storage controllers used in a storage area network (SAN) environment. Still other storage controllers are capable of servicing both file-level requests and extent-level requests.

A networked storage system can be configured to provide high availability (HA) and disaster recovery (DR) capabilities. In such configurations, two or more storage controllers, typically located at different sites, are used to replicate stored data as well as state information such as NVRAM (Non-Volatile Random Access Memory) staged I/O requests. Data received from a host by a first controller can be written to storage devices local to the first storage controller. In addition, the first storage controller can replicate the data on a second storage controller by forwarding the data to a second storage controller. The second storage controller then stores a copy of the data on storage devices local to the second controller. In the event of a failure or other problem with the first controller or the storage attached thereto, the replicated data can be retrieved from storage local to the second controller.

SUMMARY

Data is replicated on a backup node, where the granularity of the replication can vary and can be less than a full volume. A data consistency group comprising a subset of data for a volume is defined for a primary node. A set of differences for the data consistency group is created and sent to a backup node. The backup node creates one or more change logs in response to receiving the set of differences for the data consistency group. In response to receiving a request to access a file having data in the data consistency group, the backup node creates a clone of the file. The backup node determines whether an update to a data block of the file exists in the one or more change logs. In response to determining that the update to the data block exists in the one or more change logs, the backup node updates a copy of the data block for the cloned file with data in the one or more change logs.

BRIEF DESCRIPTION OF THE DRAWINGS

The aspects of the disclosure may be better understood, and numerous objects, features, and advantages made apparent to those skilled in the art by referencing the accompanying drawings.

FIG. 7 depicts a block diagram illustrating data blocks for a file as replicated and used on a destination node per the operations illustrated in FIG. 6.

DETAILED DESCRIPTION

The description that follows includes example systems, methods, techniques, instruction sequences and computer program products that embody techniques of the aspects of the disclosure. However, it is understood that the described aspects of the disclosure may be practiced without these specific details. In other instances, well-known instruction instances, protocols, structures and techniques have not been shown in detail in order not to obfuscate the description.

Overview

Aspects of the disclosed subject matter include replicating data across multiple storage devices, storage controllers or storage subsystems using a granularity that is less than a full volume. A networked storage system can be configured to replicate data across multiple storage devices, storage controllers, or storage subsystems. Replicating data can be useful in disaster recovery operations. Replicating data across multiple storage devices can aid in allowing a system to meet designated recovery point objectives (RPOs) and recovery time objectives (RTOs). A business specifies an RTO as the maximum amount of time that the business tolerates lack of access to the business' data. A business specifies an RPO as the amount of data in terms of time that can be lost due to an interruption. In conventional systems, the unit of replication is typically a volume. Thus, data consistency and availability can be provided at the granularity of a volume. For availability, data is maintained on different storage devices at different sites as previously mentioned. To ensure consistency of data across the different storage elements, data is replicated across the different storage elements. At the granularity of a volume, data can be replicated efficiently across the different storage elements at distant sites.

Storage system users typically place datasets for multiple applications in a single volume. Thus, using a volume as the unit of replication results in all of the applications using a volume being in the failover domain and having the same RPO. However, users must choose between the storage efficiency provided by a volume granularity vs. having a more finely tuned failover domain that includes a limited set of high priority applications. The various aspects of the disclosure described herein provide a means for a storage system user to define a replication granularity that is less than a full volume while providing the ability to maintain desired RPOs and RTOs at acceptable performance levels.

Example Illustrations

Figure 1:
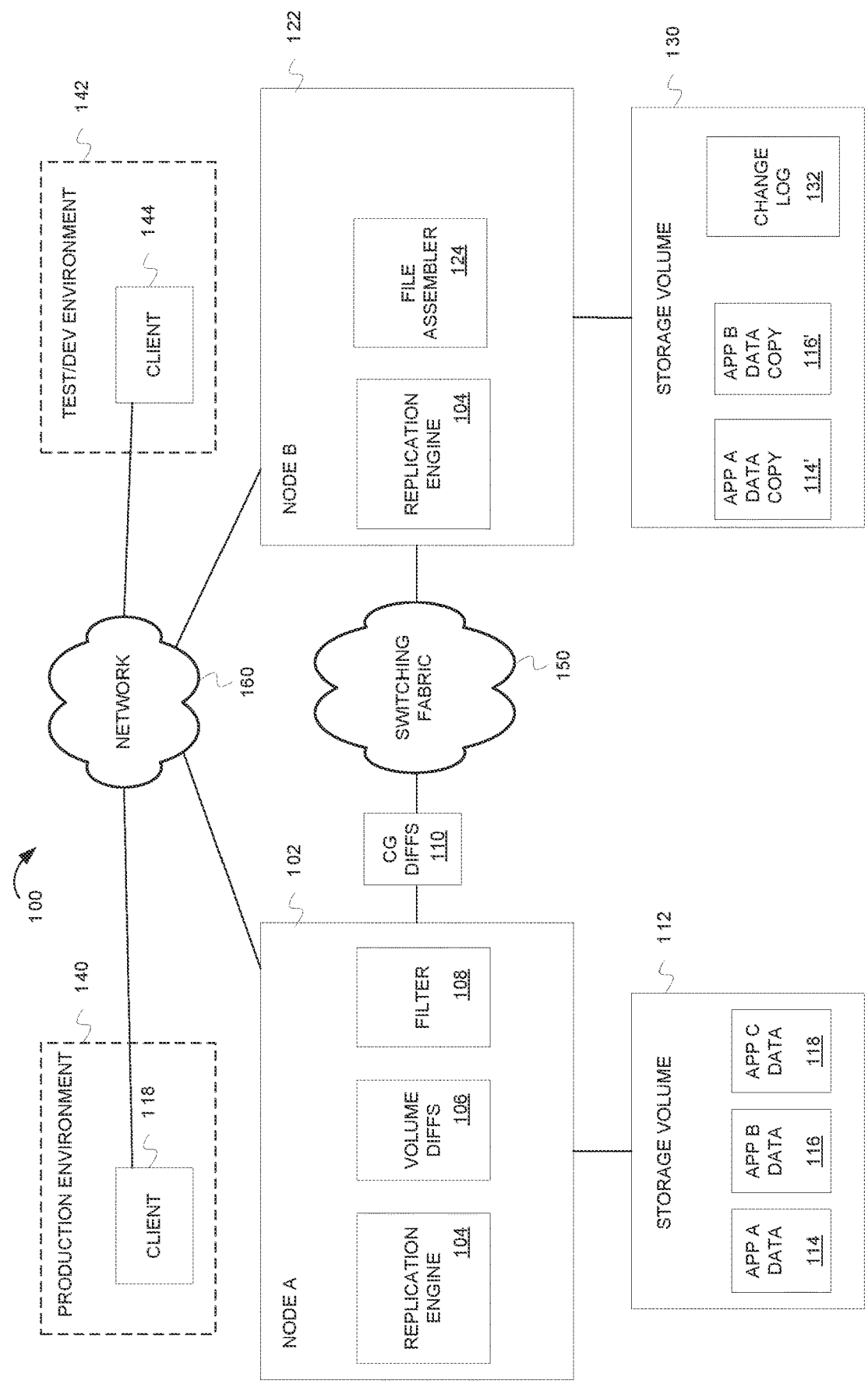
FIG. 1 depicts a distributed storage system for replicating data between volumes, according to some features.
Figure 2:
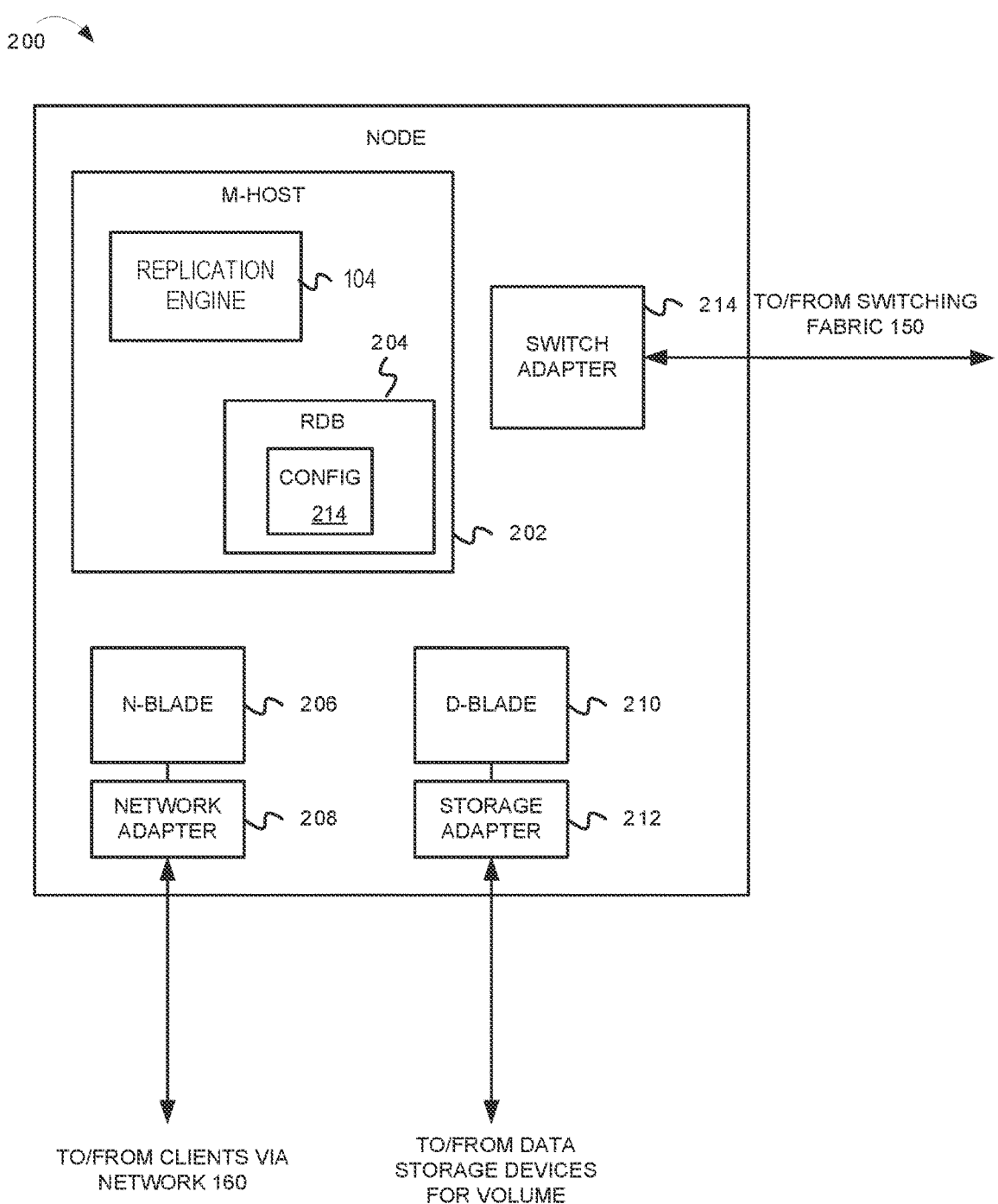
FIG. 2 depicts a block diagram of a node in a distributed storage system, according to some features.

FIG. 1 depicts a distributed storage system for replicating data between volumes, according to some features. FIG. 1 depicts a system 100 that includes two nodes (e.g., node 102 and node 122). Each node can be configured to provide storage service for data containers or objects (e.g., files) across one or more data storage volumes 112 and 130. The nodes 102 and 122 can be interconnected through a switching fabric 150. As an example, the switching fabric 150 can be a Gigabit Ethernet switches. The nodes 102 and 122 include various functional components that cooperate to provide a distributed storage system architecture. An example of the nodes 102 and 122 is depicted in FIG. 2, which is described in more detail below.

The nodes 102 and 122 can be communicably coupled to clients 118 and 144 over one or more networks (e.g., network 160). The node 102 is communicably coupled to store and retrieve data into and from storage volume 112. The node 122 is communicatively coupled to store and retrieve data into and from storage volume 130.

The clients 118 and 144 may be general-purpose computers configured to interact with the nodes 102 and 122, respectively, in accordance with a client/server model of information delivery. That is, each of the clients 118 and 144 may request the services of the nodes 102 and 122. The nodes 102 and 122 may return the results of the services requested by the clients 118 and 144 by exchanging packets over the network 160. The clients 118 and 144 may issue packets including file-based access protocols, such as the Common Internet File System (CIFS) protocol or Network File System (NFS) protocol, over the Transmission Control Protocol/Internet Protocol (TCP/IP) when accessing information in the form of files and directories. Alternatively, the clients 118 and 144 may issue packets including block-based access protocols, such as the Small Computer Systems Interface (SCSI) protocol encapsulated over TCP (iSCSI) and SCSI encapsulated over Fibre Channel (FCP), when accessing information in the form of blocks.

According to some features, data for the storage volume 112 and the storage volume 130 may be distributed across multiple data store devices. Such data store devices may include disk drives, disk arrays (e.g., RAID arrays), and/or other data stores (e.g., flash memory) as a file-system for data, for example. According to some features, volumes can span a portion of a data store device, a collection of data store devices, or portions of multiple data store devices. A volume typically defines an overall logical arrangement of file storage on data store space in a distributed file system. According to some features, a volume can comprise data containers (e.g., files) that reside in a hierarchical directory structure within the volume. Volumes are typically configured in formats that may be associated with particular file systems, and respective volume formats typically comprise features that provide functionality to the volumes, such as providing an ability for volumes to form clusters. For example, a first file system may utilize a first format for its volumes, and a second file system may utilize a second format for its volumes.

According to some features, a node can be defined as a backup to a different node, referred to as a primary node. For example, the node 102 can be a primary node, and the node 122 can be a backup node that provides a backup storage device for the node 102. Therefore, data stored in the storage volume 112 can be replicated in the storage volume 130. Accordingly, if the node 102 were to fail or become otherwise nonoperational (e.g., for maintenance), the node 122 can become active to process data requests for data stored in the storage volume 130.

Additionally, a backup node can be used to provide a test environment or a development environment that operates on a copy of volumes used in a production environment. In the example illustrated in FIG. 1, client 118 operates in a production environment 140. In order to prevent testing or development from corrupting live data, the live data store on the storage volume 112 can be replicated from the production environment to the storage volume 130 that can be used by client 144 in a test or development environment 142.

For purposes of the example illustrated in FIG. 1, assume that client 118 provides three applications, applications A, B and C. Data for the applications are stored in the storage volume 112 as application A data 114, application B data 116 and application C data 118. Further, assume that the user desires to only replicate data for applications A and B, and does not desire to replicate data for application C. The user can therefore define a consistency group that comprises data sets for application A data 114 and application B data 116, while leaving application C data 118 out of the consistency group. A consistency group refers to a set of data that is to be replicated as a unit and is typically is at a granularity that is less than a volume. For example, a consistency group can be a set of files in a file system, one or more LUNs (Logical Units), one or more VMDKs (Virtual Machine Disks), or other similar groupings of data sets.

Replication engine 104 on node 102 periodically takes snapshots of the storage volume 112. A snapshot is a copy of the data in a volume at a particular point in time. Thus, the granularity of a snapshot is a volume. The timing of such snapshots can be based on RPO and RTO requirements. The replication engine 104 then determines the differences 106 between a current snapshot and a previous snapshot. The differences 106 can be processed by a filter 108 such that the differences between the volume snapshots only includes the differences for a consistency group, referred to as consistency group differences 110. Consistency group differences are a subset of the volume snapshot and therefore have a granularity that is less than the volume snapshot. Consistency group differences 110 are transmitted to the backup node (e.g., node 122), where a replication engine 104 receives the consistency group differences 110. The consistency group differences 110 are stored in one or more change logs 132. According to some aspects, a change log corresponds to a version of a consistency group in the volume snapshot. In alternative aspects, a change log can correspond to more than one consistency group. Replication engine 104 can periodically apply the change logs 132 to data stored in the storage volume 130 to create application A data copy 114' and application B data copy 116', which can be part of an active file system on storage volume 130.

It should be noted that it may be the case that client 144 may read data from a volume before a change log has been applied. In order to ensure that a client reading data for a file in a consistency group obtains the desired version of the data, a file assembler 124 on the backup node reads the data copy stored on the volume, and then applies changes in change log 132 to the data in order to provide a requested version of the data to the client. As an example, assume that client 144 makes a request of backup node 122 to access version 2 of app data 114'. The file assembler 124 can create a clone of the app data 114' that contains the original data as initially received from the primary node 102 (e.g., version 1 of the data). The file assembler 124 can then apply change log 132 to the cloned data to create version 2 of the data, which can then be presented to the client 144. If subsequent versions of data are requested, the file assembler 124 can apply successive change logs until the requested version of the data is created.

Further details on the operation of system 100 are provided below with reference to FIGS. 3-6.

FIG. 2 depicts a block diagram of a node in a distributed storage system, according to some features. In particular, FIG. 2 depicts a node 200 which can be representative of either or both of nodes 102 or node 122 of FIG. 1. The node 200 includes a network adapter 208, a switch adapter 214, a storage adapter 212, a network module 206, a disk module 210, and a management host 202.

The network module 206, the disk module 210, and the management host 202 can be hardware, software, firmware, or a combination thereof. For example, the network module 206, the disk module 210, and the management host 202 can be software executing on a processor of node 200. Alternatively, the network module 206, the disk module 210, and the management host 202 can each be independent hardware units within node 200, with each having their own respective processor or processors. The network module 206 includes functionality that enables the node 200 to connect to clients over a network. The disk module 210 includes functionality to connect to one or more storage devices. It should be noted that while there is shown an equal number of network and disk modules in the illustrative cluster, there may be differing numbers of network and/or disk modules in accordance with some features. The management host 202 can include functionality for managing the node 200.

Each node 200 can be embodied as a single or dual processor storage system executing a storage operating system that implements a high-level module, such as a file system, to logically organize the information as a hierarchical structure of named directories, files and special types of files called virtual disks (or generally "objects" or "data containers") on the disks. One or more processors can execute the functions of the network module 206, while another processor(s) can execute the functions of the disk module 210.

The network adapter 208 includes a number of ports adapted to couple the node 200 to one or more clients (e.g., clients 118 and 144) over point-to-point links, wide area networks, virtual private networks implemented over a public network (Internet) or a shared local area network. The network adapter 208 thus may include the mechanical, electrical and signaling circuitry needed to connect the node 200 to the network. Illustratively, the network may be embodied as an Ethernet network or a Fibre Channel (FC) network. Each client may communicate with the node 200 by exchanging discrete frames or packets of data according to pre-defined protocols, such as TCP/IP.

The storage adapter 212 can cooperate with a storage operating system executing on the node 200 to access information requested by the clients. The information may be stored on any type of attached array of writable storage device media such as optical, magnetic tape, magnetic disks, solid state drives, bubble memory, electronic random access memory, micro-electro mechanical and any other similar media adapted to store information, including data and parity information. The storage adapter 212 can include a number of ports having input/output (I/O) interface circuitry that couples to the disks over an I/O interconnect arrangement, such as a conventional high-performance, FC link topology.

Management host 202 can include functionality for replication engine 104 and can include a replicated database (RDB) 204. RDB 204 can be a database that stores configuration data and relationships between configuration objects in a configuration 214. For example, RDB 204 can store configuration objects related to the configuration consistency groups. For example, configuration 214 can define which files, LUNs, VMDKs etc. are part of a consistency group. Additionally, RDB 204 can store volume configurations, aggregate configurations, storage configurations, policies, etc. While FIG. 2 shows the replication engine 104 as residing in the management host 202, in alternative aspects, the replication engine may located in other modules.

Figure 3:
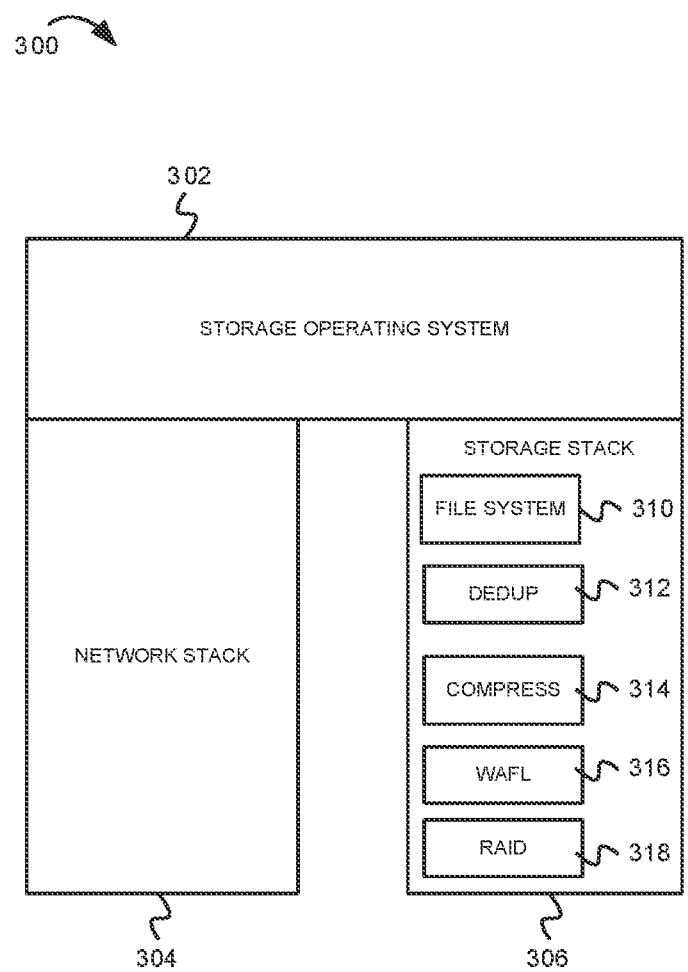
FIG. 3 illustrates a software operating environment for a storage controller and a storage virtual machine.

FIG. 3 depicts a software environment of a node 200 according to aspects of the disclosure. In some aspects of the disclosure, the software operating environment 300 includes a storage operating system 302, a network stack 304, and a storage stack 306. Storage operating system 302 controls the operations of a node 200. For example, storage operating system 302 can direct the flow of data through the various interfaces and stacks provided by the hardware and software of a node. As an example, storage operating system 302 can be a version of the Clustered Data ONTAP® storage operating system included in storage controller products available from NETAPP®, Inc. ("NETAPP") of Sunnyvale, California.

Network stack 304 provides an interface for communication via a network. For example, network stack 304 can be a TCP/IP, UDP/IP protocol stack. Other network stacks may be used and are within the scope of the aspects of the disclosure.

Storage stack 306 provides an interface to and from a storage unit, such as a storage unit within storage volumes 112 and 130 (FIG. 1). Storage stack 306 may include various drivers and software components used to provide both basic communication capability with a storage unit and provide various value-added components such as a file system layer 310, a data deduplication layer 312, a data compression layer 314, a write anywhere file layout (WAFL) layer 316, a RAID layer 318, and other enhanced storage functions. The components may be arranged as layers in the storage stack 306 or they may be independent of a layered architecture.

File system layer 310 can be a file system protocol layer that provides multi-protocol file access. Examples of such file system protocols include the Direct Access File System (DAFS) protocol, the Network File System (NFS) protocol, and the CIFS protocol.

Data deduplication layer 312 can be used to provide for more efficient data storage by eliminating multiple instances of the same data stored on storage units. Data blocks that are duplicated between files are rearranged within the storage units such that one copy of the data occupies physical storage. References to the single copy can be inserted into the file system structure such that all files or containers that contain the data refer to the same instance of the data. Deduplication can be performed on a data storage device block basis. In some aspects, data blocks on a storage device can be identified using a physical volume block number (PVBN). The PVBN uniquely identifies a particular block on a storage device. Additionally, blocks within a file can be identified by a file block number (FBN). The FBN is a logical block number that indicates the logical position of a block within a file relative to other blocks in the file. For example, FBN 0 represents the first block of a file, FBN 1 represents the second block, etc. FBNs can be mapped to a PVBN that is the actual data block on the storage device. During deduplication operations, blocks in a file that contain the same data are deduplicated by mapping the FBN for the block to the same PVBN, and maintaining a reference count of the number of FBNs that map to the PVBN. For example, assume that FBN 0 and FBN 5 of a file contain the same data, while FBNs 1-4 contain unique data. FBNs 1-4 are mapped to different PVBNs. FBN 0 and FBN 5 may be mapped to the same PVBN, thereby reducing storage requirements for the file. Similarly, blocks in different files that contain the same data can be mapped to the same PVBN. For example, if FBN 0 of file A contains the same data as FBN 3 of file B, FBN 0 of file A may be mapped to the same PVBN as FBN 3 of file B.

Data compression layer 314 provides data compression services for the storage controller. File data may be compressed according to policies established for the storage controller using any lossless data compression technique.

WAFL layer 316 stores data in an on-disk format representation that is block-based using, e.g., 3 kilobyte (KB) blocks and using a data structure such as index nodes ("inodes") to identify files and file attributes (such as creation time, access permissions, size and block location). In WAFL architectures, modified data for a file may be written to any available location, as contrasted to write-in-place architectures in which modified data is written to the original location of the data, thereby overwriting the previous data.

RAID (Redundant Array of Independent Disks) layer 318 can be used to distribute file data across multiple data storage devices in a storage volume (e.g., storage volume 112, 130) to provide data redundancy, error prevention and correction, and increased storage performance. Various RAID architectures can be used as indicated by a RAID level.

In some aspects, the deduplication operations performed by data deduplication layer 312 on one node can be leveraged for use on another node during data replication operations. For example, node 102 may perform deduplication operations to provide for storage efficiency with respect to data stored on storage volume 112. The benefit of the deduplication operations performed on node 102 can be provided to node 122 with respect to the data on node 102 that is replicated on node 122. In some aspects, a data transfer protocol, referred to as the LRSE (Logical Replication for Storage Efficiency) protocol, can be used as part of replicating the consistency group differences 110 from node 102 to node 122. In the LRSE protocol, node 122 maintains a history buffer that keeps track of data blocks that it has previously received. In some aspects, the history buffer tracks the PVBNs and FBNs associated with the data blocks that have been transferred from node 102 to node 122. Node 122 can request that blocks it already has not be transferred by node 102. Further, node 122 can receive deduplicated data, and need not perform deduplication operations on data replicated from node 102.

Similarly, the compression performed on the data by the data compression layer 314 can be leveraged in replicating data to node 122. For example, the LRSE protocol can transfer the data in its already compressed form, eliminating the need for node 122 to perform a separate data compression.

Figure 4:
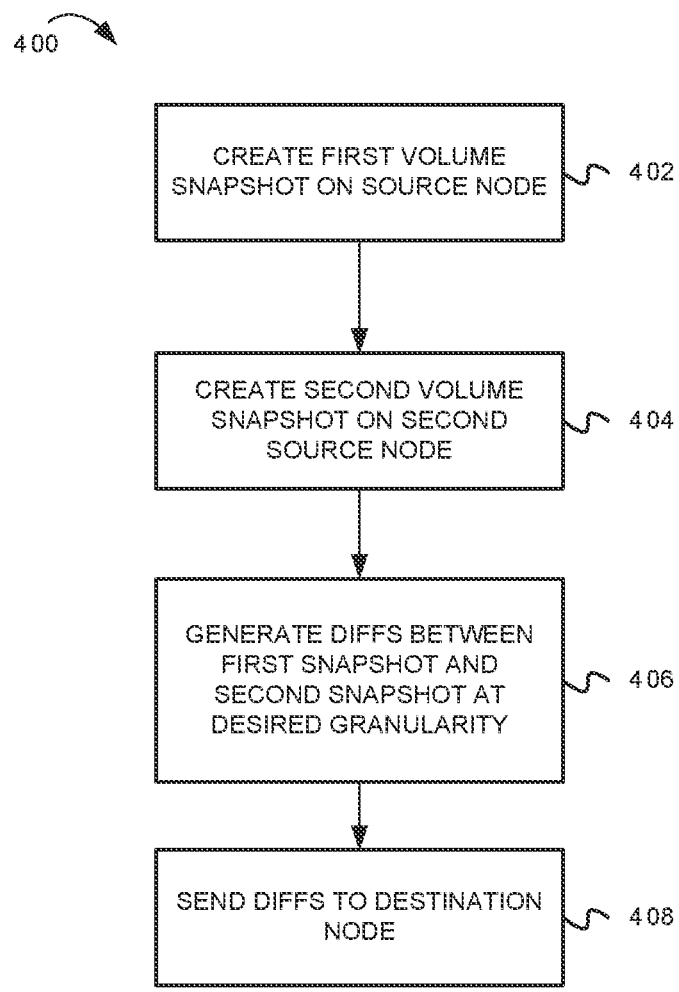
FIG. 4 is a flowchart illustrating operations for replicating a subset of volume data from a source node to a destination node

FIG. 4 is a flowchart 400 illustrating operations for replicating a subset of volume data from a source node to a destination node. The example operations illustrated in FIG. 4 may be implemented on a node (e.g. node 102, FIG. 1). According to some features, the example operations may be implemented by a replication engine 104 and filter 108 on a management host 202 (FIG. 2).

At block 402, a source node creates a first volume snapshot for a volume on a set of one or more storage devices coupled to the source node. The first volume snapshot may be a copy of the data for the designated volume at a first point in time.

At a later point in time, at block 404 the source node creates a second volume snapshot for the volume.

It should be noted that the operations illustrated in FIG. 4 may be repeated for each consistency group or volume on a source node. The second volume snapshot may be a copy of the data in the volume at a second point in time.

At block 406, the node generates a set of differences between the data in the first point in time and the second point in time. Thus the set of differences will represent the changes to the data that occurred between the first point in time and the second point in time. The differences can be processed such that only differences for one or more consistency groups in the volume are determined. In some aspects, configuration data may be read to determine the consistency groups, and only data associated with a consistency group is included in the first and second snapshots. In alternative aspects, the snapshots can include data for the entire volume, and can be processed by a filter (e.g., filter 108) such that only data for a consistency group is included in the set of differences. In some aspects, the set of differences are block level differences. That is, blocks that differ between the snapshots are included in the filtered set of differences, while blocks that are the same are not included in the filtered set of differences.

At block 408, the set of differences are transmitted to the destination node. In some aspects, the set of differences are transmitted using the LRSE protocol described above.

Figure 5:
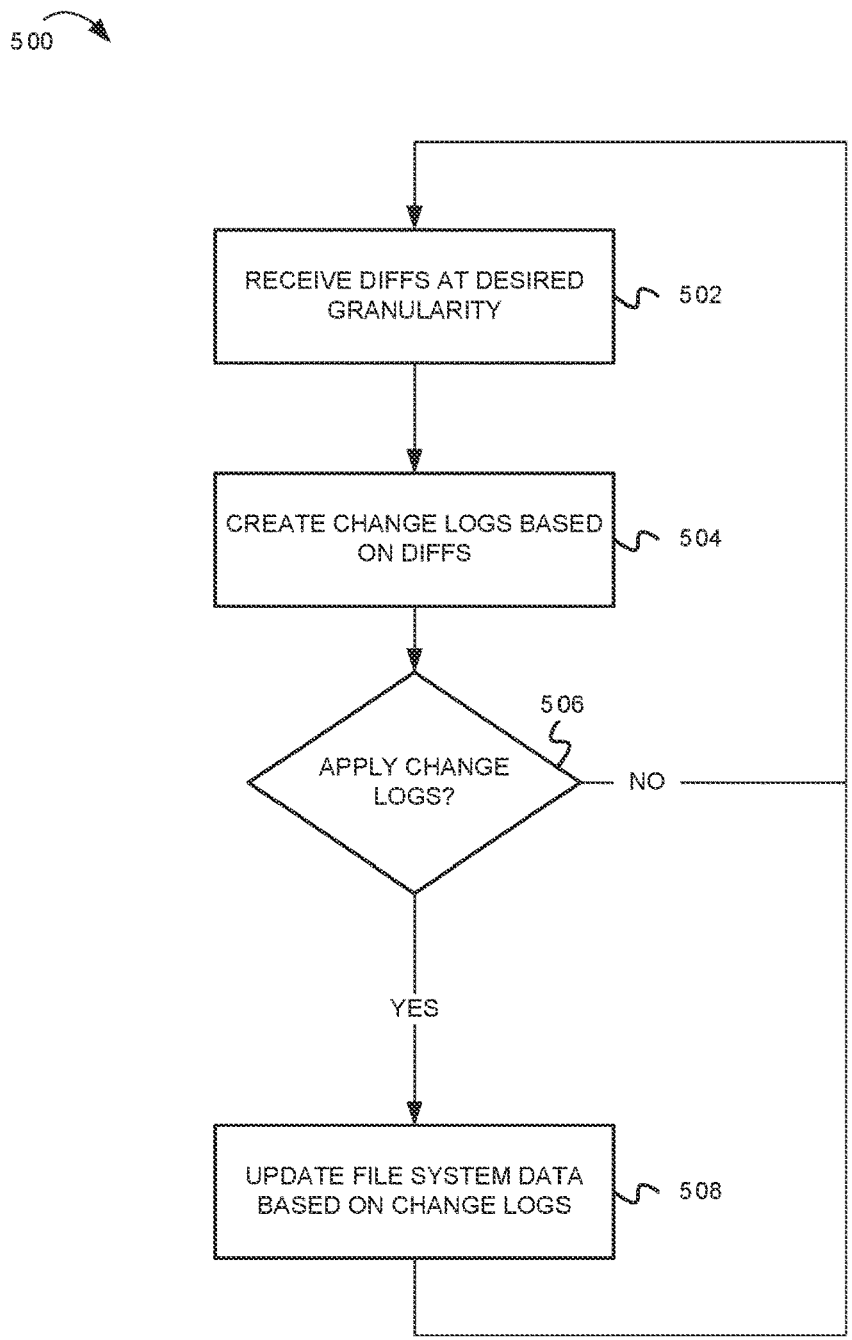
FIG. 5 is a flowchart illustrating operations for maintaining replicated data on a destination node, according to some features.

FIG. 5 is a flowchart 500 illustrating operations for maintaining replicated data on a destination node, according to some features. For example, the operations can be performed by a replication engine 104 executing on a destination node 122 (FIG. 1).

At block 502, the destination node receives a set of differences for data that is part a consistency group. As noted above, the set of differences may be received according to an LRSE protocol, which as noted above, can preserve block sharing and compression savings over the network.

At block 504, the destination node processes the set of differences to create one or more change logs. The domain of a change log can be a consistency group for a volume, or it can be for individual LUNs, VMDKs or file systems within a consistency group. In some aspects, the set of differences can be written directly to the change log. In alternative aspects, the destination node can apply the data operations to change data on the destination node in accordance with the set of differences and can log metadata blocks in the change log that provide information about the differences.

At block 506, a check is made to determine if the change logs are to be applied to the data for the consistency group in a volume. Various conditions may be used to determine if the change logs are to be applied. In some aspects, the change logs may be applied at the request of a user. In alternative aspects, the change logs may be periodically applied according to a backup schedule. For example, a user may wish to maintain hourly backups, daily backups, weekly backups, and monthly backups. Thus in some aspects, the change logs may be applied hourly, with snapshots taken after application of the change logs. Snapshots may then be retained such that a set of hourly backups exists for the most recent day, a set of daily snapshots are retained for one week, a set of weekly snapshots are retained for a month, and a set of monthly snapshots may be retained as long as specified by the user. The snapshots on the destination node can have a different granularity than the snapshots taken on the source node. For example, the granularity of a snapshot on the destination node can be an individual file, an individual LUN, or groups of files or LUNs. In some aspects, the snapshots can be based on a file cloning feature in which the cloned copies of the file(s) or LUN(s) have their own metadata to define the file attributes, but share the same physical space as the source file or LUN. If changes occur to either the cloned copy of the original source file, the changed data can be written to a new data block that is no longer shared between the source and the clone.

If the check at block 506 determines that the change logs are to be applied to the consistency group data, then at block 508, the updated data for the files, LUNs, VMDKs or other containers in the consistency group is applied to the volume data and the change logs can be discarded. The method then returns to block 502 to await reception of further consistency group difference data, which can be used to create new change logs.

Alternatively, if the check at block 506 determines that the change logs are not yet to be applied, the method returns to block 502 to await reception of further consistency group difference data that can be used to create additional change logs.

Figure 6:
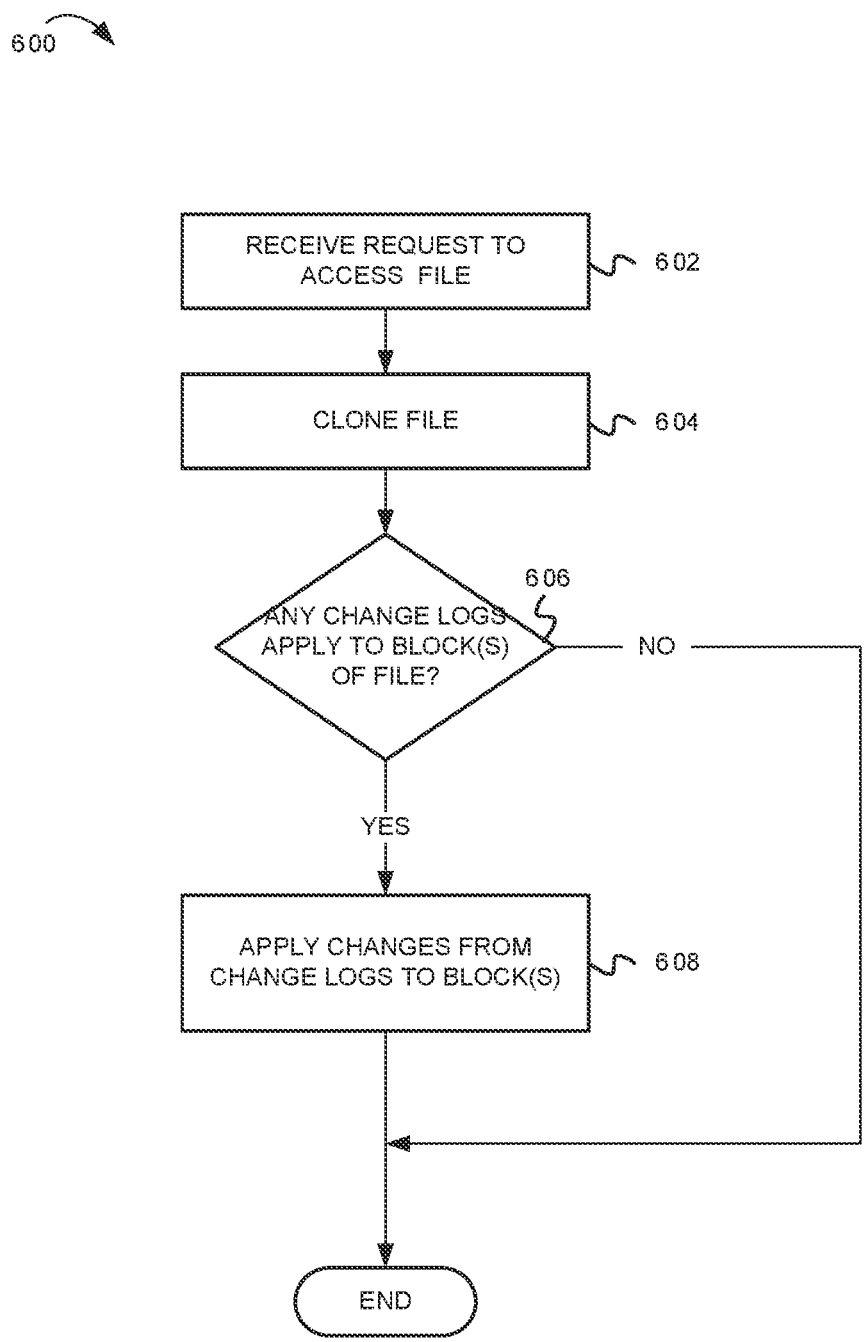
FIG. 6 is a flowchart illustrating operations for providing file data for a file that is replicated on a destination node, according to some features.

FIG. 6 is a flowchart 600 illustrating operations for providing file data for a file that is replicated on a destination node, according to some features. The operations may be performed in response to a request by a client that desires to read data from a file, LUN, VMDK etc. that is part of a consistency group, where the data to be read by the client is data for the consistency group that is replicated on a backup node.

At block 602, a backup node receives a request to access a file that is part of replicated data for a consistency group. In some aspects, the request can specify a particular version of the file. For example, if there have been five sets of changes to the file after the file's initial creation, there will be six versions of the file. The first version represents the file as it was initially created, while subsequent versions correspond to the five sets of changes in one or more change logs. The sets of changes may be in a subset of the full set of change logs such that changes associated with versions after the requested version are not applied.

At block 604, in some aspects, a clone is made of the desired file. The clone is a copy of the file as it currently exists on the volume on the backup node. Note that while the clone is an exact copy of the file on the backup node, it may not be an exact copy of the same file on the primary or source node. This is because there may be transactions in a change log that have not yet been applied to the volume on the backup node.

At block 606, a check is made to determine if there is any updated data in a change log that corresponds to the requested block. If the check at block 610 determines that there is no update data in any change logs, then the method terminates.

If the check at block 606 determines that there are one or more updates in one or more change logs, then at block 608, the backup node determines which updates in the change logs correspond to the requested version of the file and applies the changes in the change log to the clone of the file. Note that the data for the file in its current state is not updated with the change log data. Rather, the copy of the data in the clone is updated and can be used for subsequent file operations.

FIG. 7 depicts a block diagram illustrating data blocks for an example file as replicated and used on a backup node per the operations illustrated in FIG. 6. For the purposes of the example, source file 704 has four data blocks, labeled as FBNs 0-3 in FIG. 7. FBNs 0-3 are mapped to PVBNs 1, 2, 4 and 6 on a data storage device. The state of the PVBNS of the storage device are represented as blocks 702.1 After a request has been made to access the file, a clone file 706.1 is created. As shown in FIG. 7, the FBNs 0-3 of the clone file 706.1 are mapped to the same physical blocks on the storage device (e.g., PVBNS 1, 2, 4 and 6) as source file 704. Cross hatching has been used to indicate that the data for FBN3 in source file 704 is the same data as for FBN3 of clone file 706.1.

After the clone file 706.1 is created, the node checks to determine if there are any change logs having updated data for the blocks of source file 704. In this example, change log 708 has an update for FBN3 of the source file 704. The changed data is indicated in the change log by using different cross hatching than that of FBN3 in source file 704.

Blocks 702.2 illustrate the changes to the state of the storage device after the updates to file 704 in change log 708 have been applied. In particular, PVBN7 has been written with the changed data in the change long 708, as indicated by the cross hatching applied to PVBN7 in blocks 702.2. Additionally, FBN3 of clone file 706.2 has been remapped to PVBN7. Clone file 706.2 is no longer an exact replica of source file 704. However, clone file 706.2 still shares PVBNs 1, 2 and 6 with source file 704.

As can be seen from the above, aspects of the disclosure do not restrict a user to a volume level of granularity for data protection, data recovery and failover operations. For example, a granularity of a file, LUN, VMDK or other unit of data storage may be used to provide a user flexibility in determining a data protection, data recovery or failover domain, while preserving the efficiencies associated with specifying a volume as a failover domain.

Further, other granularities can be specified. For instance, an application granularity can be specified. Consider the example of application A and application B referred to above with respect to FIG. 1. FIG. 1 shows data for application A and data for application B replicating to same destination storage volume. Alternatively, a user could specify that data for application A is to be replicated, while application B is not. In the event of a failover of application A, node 122 could become the primary copy of data for application A while node 102 remains the primary copy of data for application B. After failover, data for application A can continue to replicated from node 122 to node 102 (i.e., the replication direction can be reversed) without requiring a full baseline transfer. In general, the sub-volume granular replication described above allows bi-directional replication relationships between two volumes in a space efficient ant processing efficient manner.

As will be appreciated by one skilled in the art, aspects of the disclosure may be implemented as a system, method or computer program product. Accordingly, aspects of the disclosure may take the form of a hardware aspect, a software aspect (including firmware, resident software, micro-code, etc.) or an aspect combining software and hardware aspects that may all generally be referred to herein as a "circuit," "module" or "system." Furthermore, aspects of the disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, an electromagnetic signal, an optical signal, an infrared signal, or any suitable combination thereof. A computer readable signal medium may be any computer readable medium that is not a computer readable storage medium and that can communicate, propagate, or transport a program for use by or in connection with a computer. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone computer, may execute in a distributed manner across multiple computers, and may execute on one computer while providing results and or accepting input on another computer.

Aspects of the disclosure are described with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

While the aspects of the disclosure are described with reference to various implementations and exploitations, it will be understood that these aspects are illustrative and that the scope of the aspects is not limited to them. In general, techniques for synchronizing replicated data across nodes in a networked storage system as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the aspects of the disclosure. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the aspects of the disclosure.

What is claimed is:

1. A method, comprising:
   evaluating a first snapshot of a volume at a first point in time and a second snapshot of the volume at a second point in time to identify differences of the volume between the first point in time and the second point in time, wherein the differences are identified at a volume level for data of the volume;
   utilizing configuration data, defining a subset of the data of the volume as a consistency group that includes less than all of the data of the volume, to filter the differences to generate a set of differences for the consistency group within the volume, wherein the filtering removes differences identified for data of the volume not included within the consistency group; and
   replicating the set of differences, excluding the differences identified for data of the volume not included within the consistency group, to a destination node for creating a change log having a domain at a consistency group level or sub-consistency group level.

2. The method of claim 1, comprising:
filtering the differences at a block level granularity to exclude blocks that are the same between the first snapshot and the second snapshot.

3. The method of claim 1, comprising:
utilizing the configuration data during snapshot creation so that the first snapshot includes data of the consistency group and exclude other data within the volume that is not part of the consistency group.

4. The method of claim 1, comprising:
utilizing the configuration data during snapshot creation so that the second snapshot includes data of the consistency group and exclude other data within the volume that is not part of the consistency group.

5. The method of claim 1, comprising:
transmitting the set of differences of over a network to the destination node while preserving block sharing amongst blocks storing data of the volume.

6. The method of claim 1, comprising:
transmitting the set of differences of over a network to the destination node while retaining compression of blocks storing data of the volume.

7. The method of claim 1, comprising:
defining the change log to have the domain set for a file system within the consistency group.

8. The method of claim 1, comprising:
defining the change log to have the domain set for a logical unit number (LUN) within the consistency group.

9. The method of claim 1, comprising:
defining the change log to have the domain set for a virtual machine disk within the consistency group.

10. A non-transitory machine readable medium having stored thereon instructions comprising machine executable code which when executed by a machine, cause the machine to:
evaluate a first snapshot of a volume at a first point in time and a second snapshot of the volume at a second point in time to identify differences of the volume between the first point in time and the second point in time, wherein the differences are identified at a volume level for data of the volume;
utilize configuration data, defining a subset of the data of the volume as a consistency group that includes less than all of the data of the volume, to filter the differences to generate a set of differences for the consistency group within the volume, wherein the filtering removes differences identified for data of the volume not included within the consistency group; and
replicate the set of differences, excluding the differences identified for data of the volume not included within the consistency group, to a destination node for creating a change log having a domain at a consistency group level or sub-consistency group level.

11. The non-transitory machine readable medium of claim 10, wherein the machine executable code causes the machine to:
apply data operations to change data at the destination node in relation to the set of differences; and
log metadata blocks in the change log specify information about the set of differences.

12. The non-transitory machine readable medium of claim 10, wherein the machine executable code causes the machine to:
determine whether a condition exists to trigger the application of the change log to data of the consistency group maintained at the destination node; and
in response to detecting the condition, apply the change log to the data of the consistency group maintained at the destination node.

13. The non-transitory machine readable medium of claim 10, wherein the machine executable code causes the machine to:
utilize the configuration data during snapshot creation so that the first snapshot includes data of the consistency group and exclude other data within the volume that is not part of the consistency group.

14. An apparatus comprising:
a processor; and
a machine readable storage medium having machine executable code stored therein that is executable by the processor to cause the apparatus to:
evaluate a first snapshot of a volume at a first point in time and a second snapshot of the volume at a second point in time to identify differences of the volume between the first point in time and the second point in time, wherein the differences are identified at a volume level for data of the volume;
utilize configuration data, defining a subset of the data of the volume as a consistency group that includes less than all of the data of the volume, to filter the differences to generate a set of differences for the consistency group within the volume, wherein the filtering removes differences identified for data of the volume not included within the consistency group; and
replicate the set of differences, excluding the differences identified for data of the volume not included within the consistency group, to a destination node for creating a change log having a domain at a consistency group level or sub-consistency group level.

15. The apparatus of claim 14, wherein the machine executable code causes the apparatus to:
filter the differences at a block level granularity to exclude blocks that are the same between the first snapshot and the second snapshot.

16. The apparatus of claim 14, wherein the machine executable code causes the apparatus to:
utilize the configuration data during snapshot creation so that the first snapshot includes data of the consistency group and exclude other data within the volume that is not part of the consistency group.

17. The apparatus of claim 14, wherein the machine executable code causes the apparatus to:
utilize the configuration data during snapshot creation so that the second snapshot includes data of the consistency group and exclude other data within the volume that is not part of the consistency group.

18. The apparatus of claim 14, wherein the machine executable code causes the apparatus to:
transmit the set of differences over a network to the destination node while preserving block sharing amongst blocks storing data of the volume.

19. The apparatus of claim 14, wherein the machine executable code causes the apparatus to:
transmit the set of differences over a network to the destination node while retaining compression of blocks storing data of the volume.

20. The apparatus of claim 14, wherein the machine executable code causes the apparatus to:
   define the change log to have the domain set for a file system within the consistency group.

\* \* \* \* \*